United States Patent [19]
Lambertsson

[11] Patent Number: 6,072,789
[45] Date of Patent: Jun. 6, 2000

[54] METHOD AND AN ARRANGEMENT RELATING TO TELECOMMUNICATION SYSTEMS

[75] Inventor: Marie Helén Lambertsson, Solna, Sweden

[73] Assignee: Telefonaktiebolaget LM Ericsson, Stockholm, Sweden

[21] Appl. No.: 08/981,794

[22] PCT Filed: Jun. 26, 1996

[86] PCT No.: PCT/SE96/00847

§ 371 Date: Dec. 29, 1997

§ 102(e) Date: Dec. 29, 1997

[87] PCT Pub. No.: WO97/02715

PCT Pub. Date: Jan. 23, 1997

[30] Foreign Application Priority Data

Jun. 30, 1995 [SE] Sweden ................................ 9502386

[51] Int. Cl.$^7$ ........................................................ H04J 3/16
[52] U.S. Cl. .................................................................. 370/338
[58] Field of Search .................................... 370/338, 395, 370/402, 466, 477, 347, 342, 441, 442, 480, 392, 535, 537, 486, 310, 320, 321, 335, 337, 336, 343, 334, 345, 46, 41, 465; 702/65, 183, 186; 710/16, 105; 714/47, 821; 375/200, 202, 203, 233, 238, 239; 707/205, 522, 523; 348/410; 709/104, 106, 229, 230, 232; 455/418, 419, 422, 524, 525, 517

[56] References Cited

U.S. PATENT DOCUMENTS

| | | | |
|---|---|---|---|
| 5,564,108 | 10/1996 | Hunsaker et al. | 364/413.02 |
| 5,864,554 | 1/1999 | Rostoker et al. | 370/402 |

FOREIGN PATENT DOCUMENTS

| | | | |
|---|---|---|---|
| 0 286 614 A1 | 10/1988 | European Pat. Off. | H04B 7/26 |
| 0 510 322 A2 | 10/1992 | European Pat. Off. | H04Q 7/04 |
| 0 562 890 A1 | 9/1993 | European Pat. Off. | H04Q 7/04 |
| 5-219557 | 8/1993 | Japan | H04Q 7/04 |

OTHER PUBLICATIONS

"CMS 8800 System Survey Training Document", pp. 235–240, Ericsson, 1992.

*Primary Examiner*—Dang Ton
*Attorney, Agent, or Firm*—Burns, Doane, Swecker & Mathis, L.L.P.

[57] ABSTRACT

The present invention relates to a method and arrangement in a telecommunication system for transferring of loading data (i.e., software) from a first telestation to at least one selected memory unit in a second telestation. The data is transferred on channels in a transmission link between the two stations. The channels are normally assigned traffic related information and speech related information. However, such traffic is temporarily halted in a channel that is used to send the loading data. This enables data to be quickly loaded into a selected memory unit of the telestation without causing conflict with data being sent on other channels through the link.

13 Claims, 7 Drawing Sheets

METHOD AND AN ARRANGEMENT RELATING TO TELECOMMUNICATION SYSTEMS

TECHNICAL FIELD

The present invention relates to a method for transferring of software from a first telestation into a memory unit in a second telestation. The invention also relates to an arrangement for carrying out the method.

DESCRIPTION OF THE BACKGROUND ART

The amount of transferred information in telecommunication systems has since long increased rapidly. The information could be of various kinds, e.g. speech, facsimile or video. This constantly increasing amount of transferred information requires fast transportation without unnecessary disturbances. Actions that often causes disturbances in a telecommunication system is loading of memory units, e.g. when changing software version.

The most common method when loading memory units in radio transceivers in a mobile telecommunication system is transferring of software via a control channel. This method is used in various types of mobile telecommunication systems, e.g the D-AMPS system. The D-AMPS system (Digital—Advanced Mobile Phone System) comprises a number of base stations connected to a mobile services switching centre via transmission links, so called PCM-links. A PCM-link comprises a number of traffic channels and one control channel. The control channel is common to all traffic channels and handles the control of the traffic. When reloading a memory unit in a radio transceiver in a base station, the common control channel is used. Using the common control channel when transferring loading data to a memory unit implies that the control channel cannot be used for its normal purpose i.e. handle the traffic distribution. Loading of software via the common control channel is well described in Ericsson document: "CMS 8800 System Survey Training docsient (p. 235–240)" and in the D-AMPS specification "IS-136". Normally the traffic has priority over the loading of data. The loading can therefore be very time consuming, especially when the traffic intensity is high. When the loading has priority, i.e. when consideration is not taken to the normal traffic, the reloading can disturb the normal traffic and when the intensity is very high, the traffic can be totally ruined.

A telecommunication system is known from JP 5/219557 in which a master memory unit contains information common to a number of slave memory units. At power loss in the master memory is unit, information is fetched to the master unit from the slave units, via the air interface. The purpose of the invention according to the Japanese patent is to avoid back-up battery costs.

SUMMARY OF THE INVENTION

The problem with the previous known techniques is that the transferring of loading data (the loading data is also called software) via a common control channel conflicts with the normal traffic transportation and is therefore often very time consuming.

This problem is solved by a method and an arrangement for transferring of data from a first telestation to a second telestation (the two stations are also called telestation and teleunit). The data is transferred on a transmission link between the two stations. In accordance with the invention the data is transferred on channels in the transmission link, which channels are normally assigned other types of transmission, i.e. traffic related transmission like speech information.

The present invention thus relates to a method and an arrangement for fast loading of memory units without disturbance of the normal traffic. The method includes steps for selecting a memory unit which is to be loaded in the second telestation and steps for identifying a channel on the transmission link corresponding to the selected memory unit. The method also includes steps to distribute data from the first telestation to the identified channel. The method also includes steps for transferring the data on the transmission link to the second telestation and to distribute the data to the selected memory unit.

The arrangement includes a system which comprises communication nodes, such as telestations for instance. The nodes enable transferring of data from the first to the second station. The nodes also comprises means for transmitting and receiving of messages necessary to the invention.

The object of the present invention is to achieve fast loading of a memory unit in a telestation without causing any conflict with the normal traffic handled by other memory units in the station, which units all are controlled by the common control channel.

One of the advantages with the invention is that the only transmission channel influenced by the loading is the channel tied to the load receiving memory unit in the telestation. Other channels and memory units in the station are thereby uninfluenced by the loading.

Another advantage with the invention is that it provides a fast loading of memory units without disturbing the normal traffic.

Yet another advantage with the invention is that loading of memory units is provided without occupying the common control channel.

The invention will now be described more in detail with reference to exemplifying embodiments thereof and also with reference to the accompanying drawings.

BEST MODES OF CARRYING OUT THE INVENTION

A mobile telephone network of D-AMPS type (Digital—Advanced Mobile Phone System) will now be described in general, whereafter a number of exemplifying embodiments of the invention will be described with reference to the accompanying drawings.

Figure 1:
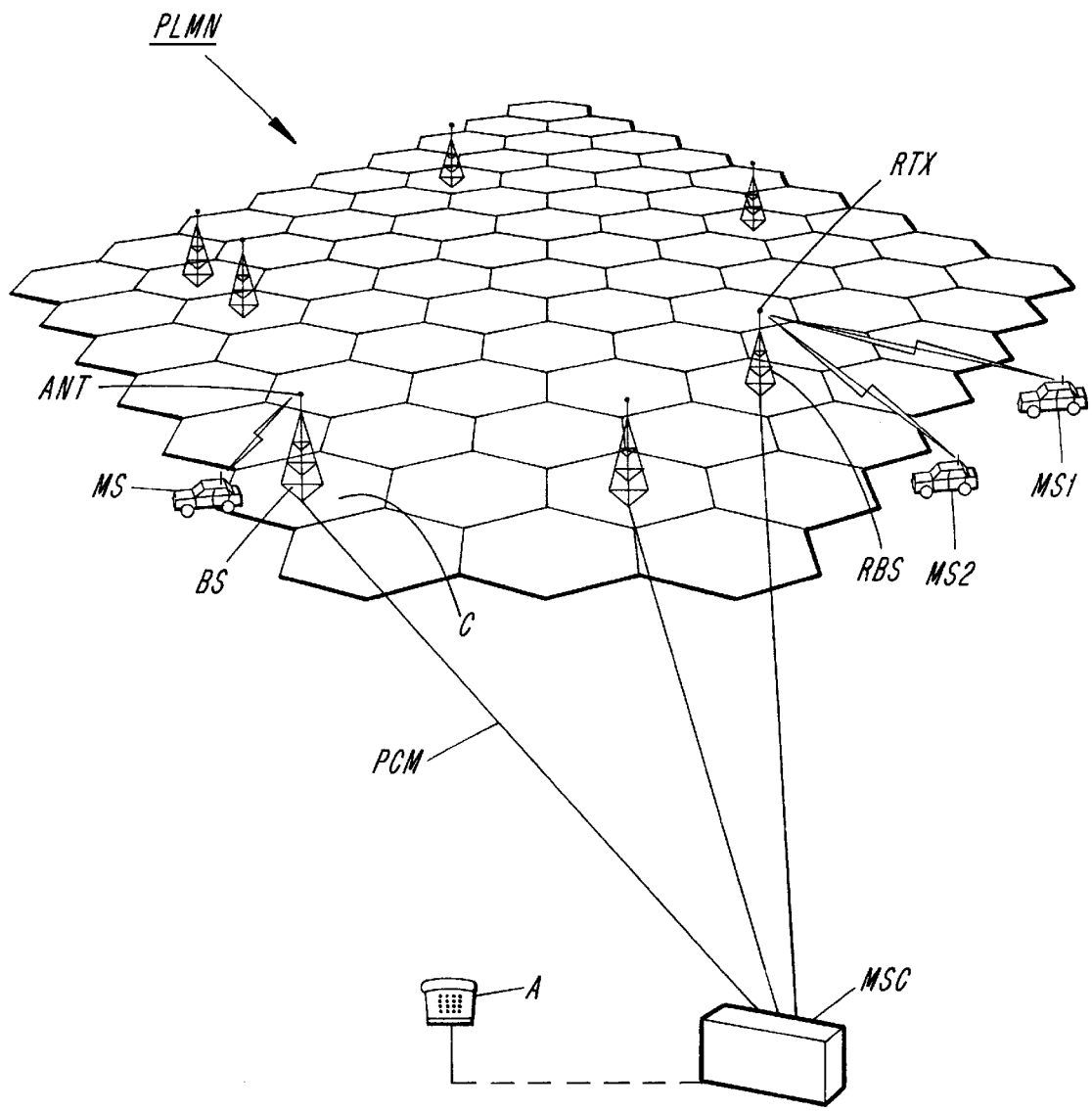
FIG. 1 is a perspective illustration of a telephone system which includes a mobile services switching centre.

A mobile telecommunication system PLMN (Public Land Mobile Network) is shown in FIG. 1. The telecommunication system is of D-AMPS type and comprises a mobile services switching centre MSC and a number of base stations BS and RBS connected to the switching centre MSC. Only a few of the existing base stations are shown in the network PLMN in FIG. 1. Numerous units included in a complete telecommunication system have been excluded from FIG. 1 in an attempt to make the figure more clear. FIG. 1 illustrates solely those units in a public land mobile network PLMN that are necessary to obtain an understanding of the invention. A connection from the switching centre MSC to other parts of the system is indicated with a broken line. The switching centre MSC distributes traffic information via transmission links PCM to the base stations BS and RBS. The traffic information could be speech information between two subscribers A and MS. The base stations transmit and receive information to and from mobile subscribers MS, MS1, MS2 with the aid of radio signals via an antenna ANT and RTX. An area covered by a base station is called a cell C. The base stations BS and RBS are arranged to establish radio connections to a mobile subscriber MS, MS1 and MS2 situated within the cell. The radio connections are shown in the figure as a zig-zag symbol between the base stations BS and mobile subscriber MS, MS1 and MS2.

Figure 2:
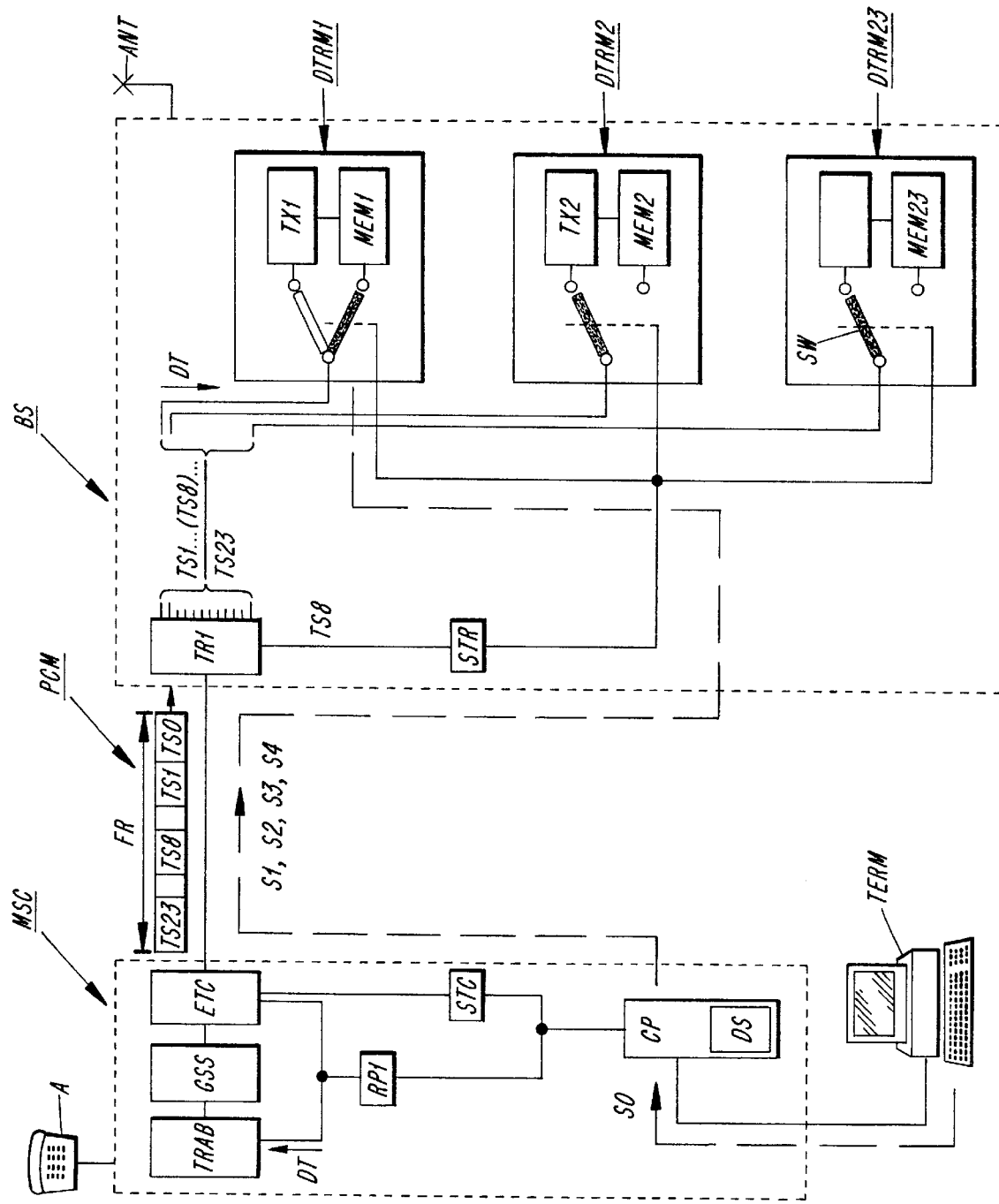
FIG. 2 is a block schematic illustration of a mobile services switching centre, a PCM-link and a base station.

FIG. 2 illustrates the units necessary for carrying out the invention shown in FIG. 1 more in detail. The switching centre MSC is connected to the base station BS, via the link PCM. There are at least two links between the switching centre and the base station, one link for each direction in which information is transferred. In FIG. 2 only the so called down-link PCM is shown, i.e. the link for transferring information from the switching centre MSC to the base station BS. The link PCM shown in the figure comprises twenty-four timeslots TS0–TS23, so called channels. One of the channels, a slot TS0, is intended for synchronisation, the so called synchronisation channel TS0. Another channel, time slot TSB, is intended for control signalling, the so called control channel TS8. The remaining channels, timeslots TS1 .. (8) .. TS23, are under normal conditions used to transfer traffic information, e.g. speech information. These channels will from now on be referred to as traffic channels TS1 .. (8) .. TS23. All channels (synchronisation, control and traffic) are sent together in a frame FR between the mobile switching centre MSC and the base station BS. The twenty-four time slot link shown in FIG. 2 is used in the D-AMPS system. Other types of links could be used in other systems. In a GSM-system for example links with thirty-two time slots are used. Using different kinds of links does not conflict with the idea behind the invention.

The switching centre MSC comprises a group switch GSS which distribute traffic information via an exchange terminal circuit ETC, bidirectionally between the group switch GSS and the transmission link PCM. The terminal circuit ETC supervises the hardware interface for the transmission link between the switching centre MSC to the base station BS. The group switch GSS is connected to a transcoder board TRAB that converts incoming speech signals to a format suitable for transmission on the PCM-link. A central processor CP is connected to the terminal circuit ETC via a signalling terminal circuit STC. The signalling terminal circuit STC mediates control signals from the central processor CP to the terminal circuit ETC. The terminal circuit ETC places the control signals from the central processor CP in the control channel TS8, intended for control signalling. The base station BS comprises digital transceiver modules DTRM1, DTRM2 and DTRM23. In FIG. 2, only three transceiver modules are shown even if the total amount of transceiver modules in the base station is equal to the number of timeslots intended for speech TS1 .. (8) .. TS23, i.e. twenty two. The digital transceiver modules DTRM1, DTRM2 and DTRM23 are tied to the channels with corresponding number, i.e. the traffic channels TS1, TS2, TS23. The transceiver modules DTRM1, DTRM2 and DTRM23 comprise transmitter units TX1, TX2, TX23 connected to an outgoing antenna (not shown in FIG. 2). The first transmitter unit TX1 in the first transceiver module DTRM1 is tied to the first time slot TS1 in the PCM-link via a transmission radio interface TRI. The first traffic channel TS1 carries speech information incoming from the subscriber A, a so called A-subscriber, via the group switch GSS. The speech information is transferred to the first transmitter TX1 and then transmitted from the first transmitter TX1 via an antenna ANT to the mobile subscriber MS, which is a so called B-subscriber. The antenna ANT is common to all transmitters in the base station BS. The transceiver modules DTRM1, DTRM2 and DTRM23 comprises memory units MEM1, MEM2 and MEM23. The memory units contain information necessary for the function of the transceiver modules. The memory units MEM1, MEM2, MEM23 will be further discussed later in the specification. The base station BS also comprises a signalling terminal regional STR connected between the transmission radio interface TRI and transceiver modules DTRM1, DTRM2 and DTRM23. The signalling terminal regional STR extracts the control channel TS8 from the frame FR. The control channel TSB was earlier mentioned in connection with the signalling terminal circuit STC. The information in the control channel TS8 will under normal conditions, i.e. when speech information is carried on the traffic channels TS1 .. (TS8) .. TS23, be used to send control signals from the switching centre MSC to the base station and vice versa. Examples of information carried on the control channel is paging and access information. This kind of information can either be used in the base station BS or forwarded to the mobile station MS. The configuration shown in FIG. 2 is just to be seen as an example of a configuration that can be used to practise the invention. Variations are possible. The signalling terminal circuit STR can for example loop back the information in the control channel to the Transmission Radio Interface TRI whereby the control information is forwarded to the transceiver modules DTRM on the same hardware connection as the traffic channel.

An embodiment of the method which will now be described may also be applied in systems of similar types, other than D-AMPS, for instance in the European mobile telephone system GSM and the Pacific system PDC etc. The embodiment described more in detail below illustrates the loading of a memory unit in the base station BS from a store unit DS in the switching centre MSC. In the embodiment the control channel will be used to switch data receiving unit in the transceiver modules DTRM1, DTRM2 and DTRM23 from being the transmitter units TX1, TX2, TX23 to be the memory units MEM1, MEM2, MEM23. This changeover is shown schematically in the figure with a contact breaker symbol SW in every transceiver module DTRM1, DTRM2, DTRM23. The contact breakers SW combine the transmission radio interface TRI with either the transmitters TX1, TX2, TX23 or the memory units MEM1, MEM2, MEM23. The data store unit DS is shown in FIG. 2 within the central processor CP in the switching centre MSC. The data store unit DS contain software intended for the memory units MEM1–MEM23 in the base station BS. The software held in a data store unit is necessary for the control and supervision of different parts within the transceiver modules, which parts could be for example the transmitters. The method is carried out when there is a need for change of software in the memory units MEM1–MEM23, to a new software version. Change of application software is for example needed when the system operator have to update parameters necessary to supervise or to control the hardware in the base station BS. The embodiment is able to perform this important loading function of the units MEM1–MEM23. Only the loading of one of the memory units is shown below even if all memory units finally are meant to be loaded in the illustrated embodiment.

The method comprises the following steps:

Ordering of updating of software in the memory units MEM1–MEM23 to a new version. The ordering is performed by a Software-Change command S0 given from a computer terminal TERM connected to the mobile services switching centre MSC. The command is sent from the computer terminal TERM to the central processor CP.

Selection of an available memory unit MEM1 to be loaded, the so called first memory unit MEM1. The selection is performed by the central processor CP when a memory unit in an available transceiver module DTRM1 is found by the processor CP. The expression "available module" means that the module at the moment is not involved in sending or transmitting traffic information.

Sending of a transceiver module blocking signal S1 from the central processor CP, via the control channel TSB in the transmission link PCM, to the first transceiver unit DTRM1 in the base station BS.

Blocking of the first transceiver module DTRM1. The transceiver module cannot now carry any traffic.

Sending of a transceiver module changeover signal S2 from the central processor CP, via the control channel TS8 in the transmission link PCM, to the first transceiver module DTRM1 in the base station BS.

Changeover in the first transceiver module DTPM1 from the transmitter TX1 to the memory MEM1. The changeover is illustrated in FIG. 2 in the first module DTRM1 with a filled contact breaker symbol between the transmission radio interface TRI and the first memory unit MEM1. The information received from the traffic channel TS1 is before the changeover tied to the transmitter TX1. The memory is after the changeover ready to receive information from the first traffic channel TS1.

Identification in the processor CP of the channel TS1 corresponding to the first memory unit MEM1 to be loaded. The channel will hereafter be called the first traffic channel TS1.

Distribution of data DT from the data store unit DS in the central processor CP, via the regional processor RP1, to the transcoder board TRAB. The data is sent together with an instruction from the central processor to the transcoder board TRAB to place the data in the identified channel corresponding to the first memory unit MEM1, i.e. the first traffic channel TS1.

Transmission of the frame FR, via the PCM-link, from the mobile, switching centre MSC to the base station BS. The frame contains the data DT intended for the first memory unit MEM1 in the first traffic channel MEM1. TS1. Normally only a fraction of the total amount of data needed to fill the memory unit MEM1 is sent in one frame. A large number of frames are therefore often necessary to change software in the unit Distribution of the data DT from the first traffic channel TS1 in the PCM-link to the first memory MEM1 in the first transceiver unit DTRM1.

Storing of the received data DT in the memory unit MEM1.

Sending of a transceiver module changeback signal S3 from the central processor CP, via the control channel TS8 in the transmission link PCM, to the first transceiver module DTRM1 in the base station BS.

Change in the first transceiver module DTRM1 from the memory MEM1 back to the transceiver TX1.

Sending of a transceiver module deblocking signal S4 from the central processor CP, via the control channel TS8 in the transmission link PCM, to the first transceiver unit DTRM1.

Deblocking of the first transceiver module DTRM1. The transceiver module can again carry traffic. As have been mentioned before only a part of the total number of steps performed are shown above. Confirmation messages to the central processor CP have for example been excluded.

Figure 3:
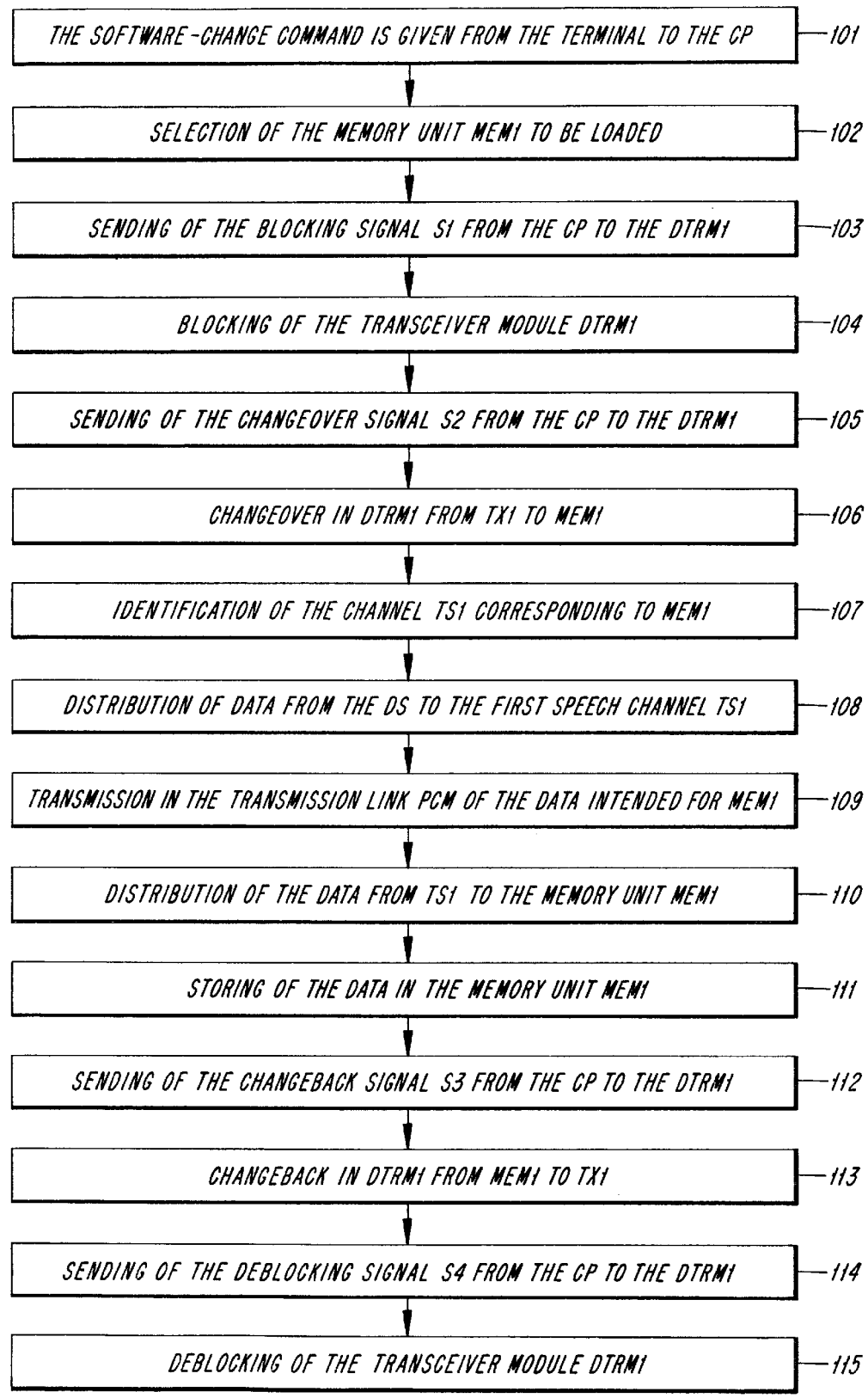
FIG. 3 is a flow sheet which illustrates the procedure for loading of data into a memory unit.

FIG. 3 is a flow sheet illustrating the aforedescribed method. The flow sheet illustrates the steps that are most essential to the concept behind the invention. The abbreviations in the text in the figure have been explained in the foregoing. The method is carried out in accordance with FIG. 3 and in accordance with the following description:

The Software-Change command S0 is given from the computer terminal TERM to the central processor CF, in accordance with block 101.

Selection of the memory unit MEM1 to be loaded, in accordance with block 102. The selection is done by the central processor CP when finding an available transceiver module DTRM1.

Sending of the blocking signal S1 from the central processor CP to the first transceiver unit DTRM1, in accordance with block 103.

Blocking of the first transceiver module DTRM1, in accordance with block 104.

Sending of a transceiver module changeover signal S2 from the central processor CP to the first transceiver module DTRM1, in accordance with block 105.

Changeover in the first transceiver module DTRM1 from the transmitter TX1 to the memory MEM1, in accordance with block 106.

Identification of the channel TS1 corresponding to the first memory unit MEM1 to be loaded, in accordance with block 107.

Distribution of data from the data store unit DS to the first traffic channel TS1, in accordance with block 108.

Transmission over the transmission link PCM on the first traffic channel TS1, of the data DT intended for the first memory unit MEM1, in accordance with block 109.

Distribution of the data from the first traffic channel TS1 in PCM-link to the first memory MEM1, in accordance with block 110.

Storing of the received data in the memory unit MEM1, in accordance with block 111.

Sending of the transceiver module changeback signal S3 from the central processor CP to the first transceiver module DTRM1, in accordance with block 112.

Change in the first transceiver module DTRM1 from the memory MEM1 back to the transmitter TX1, in accordance with block 113.

Sending of the transceiver module deblocking signal 54 from the central processor CP to the first transceiver unit DTRM1, in accordance with block 114.

Deblocking of the first transceiver module DTRM1, in accordance with block 115.

Figure 4A:
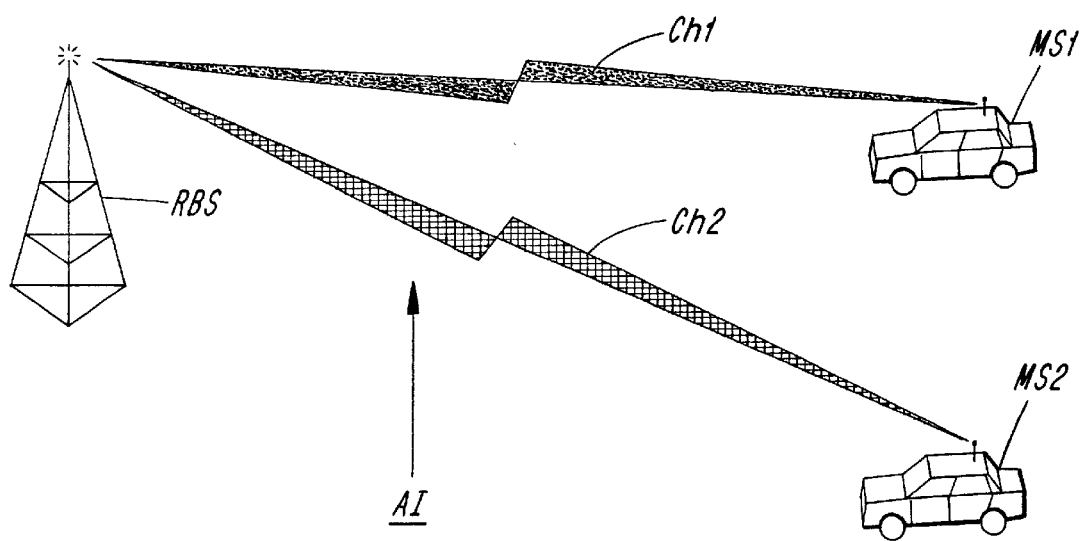
FIG. 4a is a perspective illustration of a base station connected to two mobile stations via an air interface.
Figure 4B:
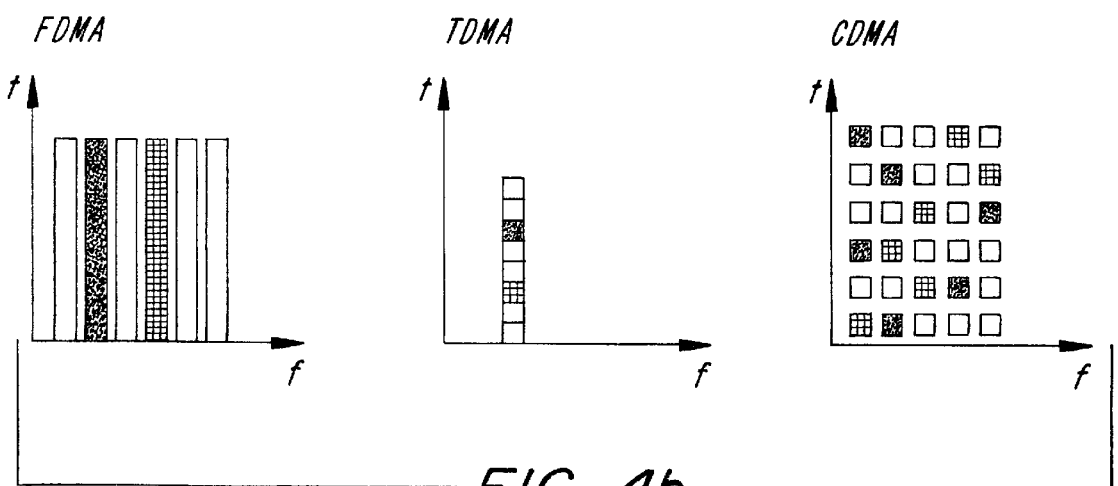
FIG. 4b is a diagram showing different air interface transmission concepts.

In connection with FIGS. 4a and 4b, a base station RBS will be described. The base station is operationally connected to two mobile stations, a first mobile station MS1 and a second mobile station MS2. The connection is shown with two zig-zag symbols between the base station RBS and the two mobile stations MS1 and MS2. The zig-zag symbols ch1 and ch2 are marked with two different patterns. The two pattern symbolise two traffic channels. The flat coloured zig-zag symbol between the base station RBS and the first mobile station MS1 symbolise a channel dedicated to the first station MS1. The square coloured zig-zag symbol between the base station RBS and the second mobile station MS2 symbolise a traffic channel dedicated to the second station MS2. The traffic channels normally carries speech information.

The transmission concept between the base station and the mobile stations could be of various kinds, e.g. FDMA (Frequency Division Multiple Access), TDMA (Time Division Multiple Access) or CDMA (Code Division Multiple Access). The propagation in time- and frequency domain for the different concepts FDMA, TDMA and CDMA is shown in FIG. 4b.

In a FDMA-diagram six different channels are shown. Each channel is symbolised with a column and uses one carrier frequency and is intended for one subscriber, i.e. each frequency band is assigned one certain subscriber. If the system shown in FIG. 4a is a FDMA system, the flat coloured column in FIG. 4b is a traffic channel intended for the first mobile station MS1 and the square coloured column is a traffic channel intended for the second mobile station MS2.

In a TDMA-system the frequency band is better utilised. Every carrier frequency in the TDMA-system is divided into a number of time slots. Each time slot may be assigned to one subscriber. In FIG. 4b in the TDMA-diagram one carrier frequency is divided into eight time slots. Seven of the slots are traffic channels, each channel intended for one subscriber. One time slot is used as a control channel common to the traffic channels. The control channel is used to transfer control information to the traffic channels. If the system shown in FIG. 4a is a TDMA system, the flat coloured time slot in FIG. 4b is a traffic channel intended for the first mobile station MS1 and the square coloured time slot is a traffic channel intended for the second mobile station MS2.

In a CDMA-system it is possible to use a large number of channels in the frequency spectrum. In FIG. 4b, in the CDMA-diagram, it is shown how signals are spread in the whole frequency spectrum. If the system shown in FIG. 4a is a CDMA-system the flat coloured symbol represent the channel meant for the first mobile station MS1 and the square coloured symbol represent the channel meant for the second mobile station MS2. To be able to separate the two different channels from each other the data in each channel is provided with a code. At the reception of signals intended for the first mobile station MS1 from the base station, the first mobile station MS1 only accepts energy from the channel coded with a code intended for the first mobile station MS1. The remaining signals only contribute with noise. Even if it is theoretically possible to use an unlimited number of channels, the noise will increase with the number of channels and limit the number of channels. Several different types of CDMA-system exist in which the invention may be used (e.g. Direct Sequence CDSA, Slow Frequency Hopping CDMA and Fast Frequency Hopping CDMA).

Figure 5:
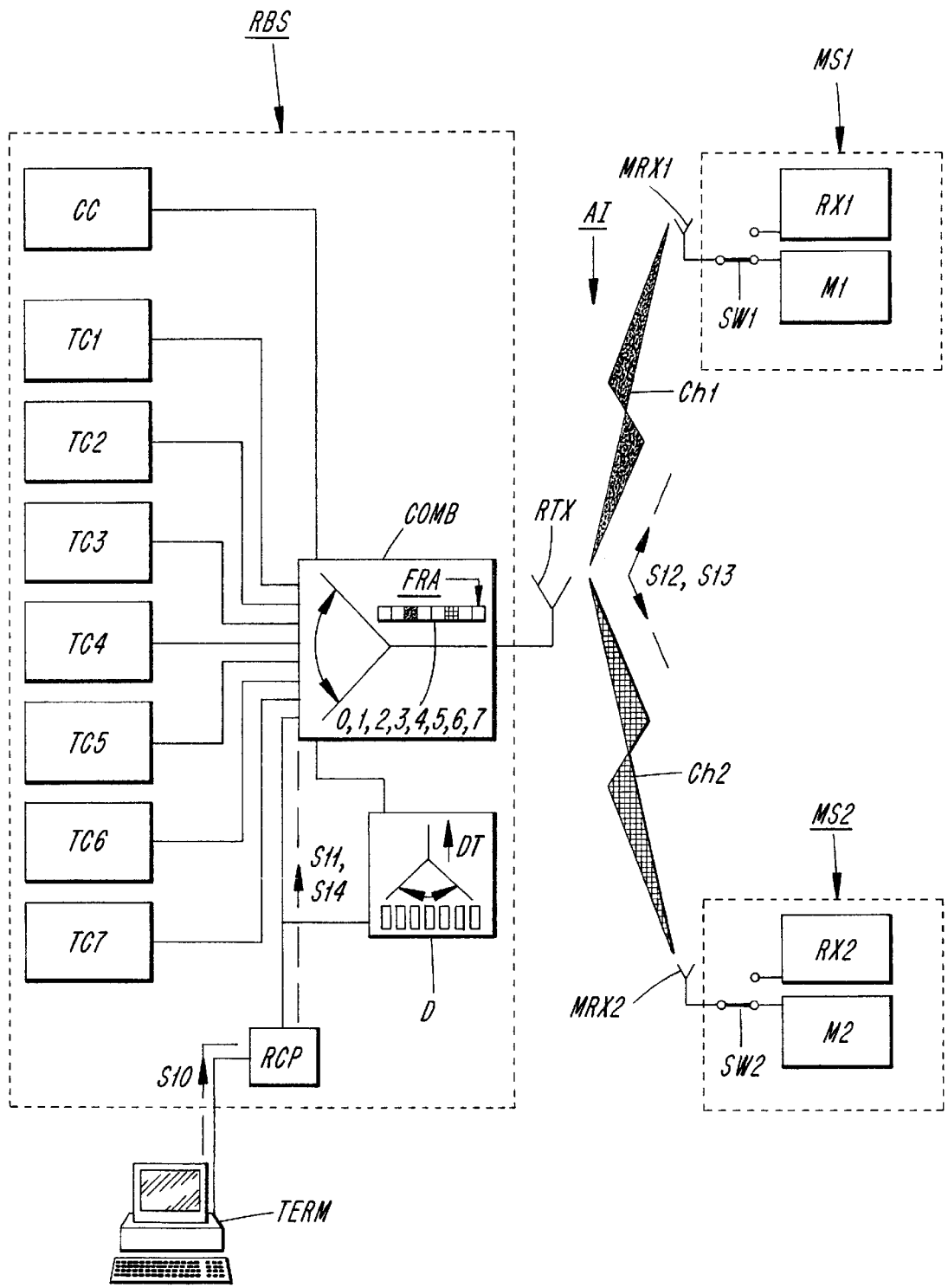
FIG. 5 is a block schematic illustration of a base station connected to two mobile stations via an air interface.

A further illustrated embodiment of the invention will now be presented with the aid of FIG. 5. The transferring of the loading information is performed via an air interface between the base station RBS and the mobile stations. The concept chosen for the illustrated invention is of TDMA type. The concept chosen is however of less importance to the invention and could as well have been of FDMA, CDMA or any other similar type. A block diagram of the base station RBS and the mobile stations MS1 and MS2 mentioned in FIG. 4 is shown in FIG. 5. The base station RBS comprises a combiner COMB which combines signals from a control channel CC and seven traffic channels TC1–TC7 into a TDMA frame FRA consisting of eight timeslots 0–7 where the first time slot 0 is used for control signalling and represent the control channel CC. The remaining time slots 1–7 represent the traffic channels TC1–TC7. The combiner COMB is connected to a base station antenna RTX. The base station RBS is associated with the mobile stations MS1 and MS2 via the air interface AI between the antenna RTX connected to the base station RBS and two antennas MRX1 and MRX2 each one connected to one of the mobile stations MS1 and MS2. The mobile stations MS1 and MS2 comprises software modules M1 and M2. The software modules hold control and supervision information specific to a system operator to which the subscribers belong. The modules M1 and M2 are each one connected to various parts within the mobile stations, parts like a processor unit or a receiver unit. The modules M1 and M2 in the stations are connected only with receiver units RX1 and RX2 within the mobiles in FIG. 5 in an attempt to make the figure more understandable. In FIG. 5 each mobile station MS1 and MS2 is provided with a contact breaker symbol SW1 and SW2. The breakers are only schematically drawn and symbolise the possibility to switch from receiving of normal traffic data, like speech, to receiving of loading data. Only the position for receiving loading data is shown in FIG. 5. The base station RBS also comprises a data store unit D in which data information intended to be loaded to the mobile stations MS1 and MS2 is held. A central processor RCP controls the combiner COMB and the data store unit D.

An embodiment of the method, which now will be presented, is according to the illustrated embodiment carried out when there is a need for change of software in the memory modules M1 and M2 in the mobile stations MS1, MS2 from an old version to a new software version. The embodiment is able to perform this important loading function and comprises the following steps:

Ordering of updating to a new software version in the memory modules M1 and M2. A command S10 is given from the computer terminal TERM connected to the base station RBS, to the central processor RCP.

Selection of the mobile stations which are handled by the base station which mobile stations contain the memory modules M1 and M2 to be loaded with the new software version. The selection is performed by the central processor RCP by choosing mobile stations that are not engaged. The method for selecting a mobile station and to set up a connection between the basestation and the mobile station comprises a large number of steps. The method is well known by one skilled in the art and will for that reason not be further explained.

In the illustrated method below both of the mobile stations MS1 and MS2 are found to be available.

Sending of a mobile subscriber blocking signal S11 from the central processor RCP to the combiner COMB. The blocking signal. prevent the combiner from using two of the seven traffic channels TC1–TC7 which are normally intended for traffic data. Instead two time slots, time slot 2 and time slot 5 in the frame FRA, are selected and prepared for receiving information from the data store unit D.

Sending of mobile station changeover signals S12 from the base station RBS to the two mobile stations MS1 and MS2, via the control channel in time slot 0 in the frame FRA.

Changeover in the mobile stations MS1 and MS2 from traffic state to loading state. The changeover is illustrated in FIG. 5 with the contact breaker symbols SW1, SW2 already in loading state, i.e. connected to the memory modules M1 and M2.

Identification of channels 2 and 5 corresponding to the memory units M1 and M2 to be loaded.

Distribution of data DT from the data store unit D to the identified time slots/channels 2 and 5 in the frame FRA. The two channels are dedicated the two selected mobile stations MS1 and MS2. The channels 2 and 5 are marked with flat and square coloured symbols in the frame FRA.

Transmission of the frame FRA from the base station RBS to the mobile stations MS1 and MS2. The transmission is marked with flat coloured and square coloured zig-zag symbols between the base station RBS and the mobile stations MS1 and MS2.

Distribution of data DT from the time slots/channels 2 and 5 in the frame FPA to the memory modules M1 and M2 in the mobile stations MS1 and MS2.

Storing of the received data DT in the memory modules M1 and M2 in the mobile stations MS1 and MS2.

Sending of a mobile station changeback signal S13 from the base station RBS to the two mobile stations MS1 and MS2.

Changeback in the mobile stations MS1 and MS2 from loading state to traffic state. The changeback is not illustrated in FIG. 5.

Sending of a mobile subscriber deblocking signal S14 from the central processor RCP to the combiner COMB.

Setting the combiner COMB in a state where it is once again possible to receive traffic data.

Figure 6:
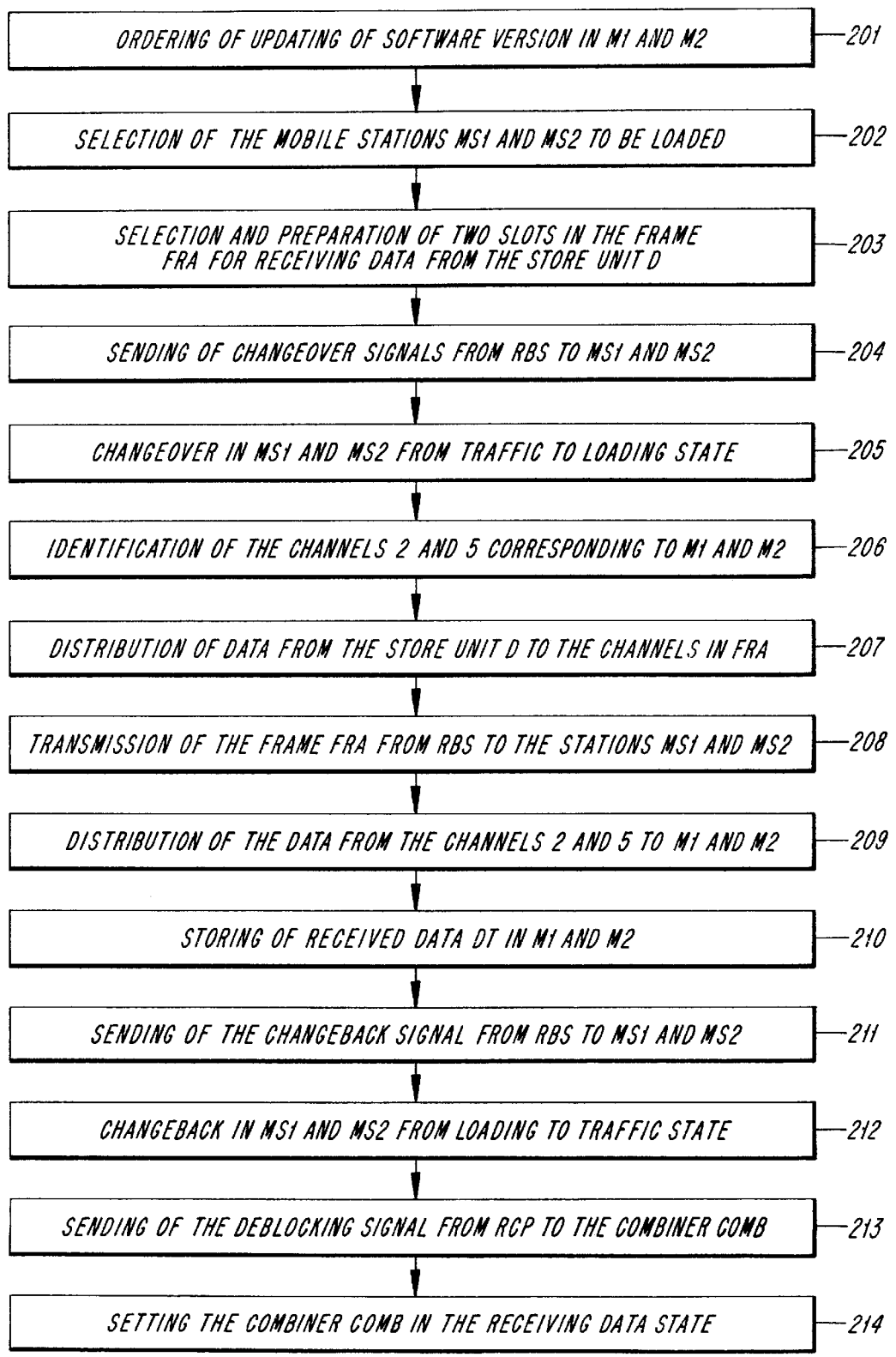
FIG. 6 is a flow sheet which illustrates the procedure for loading of data into memory units in two mobile stations.

FIG. 6 is a flow sheet illustrating the aforedescribed method. The flow sheet illustrates the most essential steps to the concept behind the invention. The abbreviations in the text in the figure have been explained in the foregoing. The method is carried out in accordance with FIG. 6 and in accordance with the following description:

Ordering of updating of the memory modules M1 and M2 to the new software version, in accordance with block 201.

Selection of the mobile stations to be loaded with the new software version, in accordance with block 202.

Sending of the mobile subscriber blocking signal S11 from the central processor RCP to the combiner COMB, in accordance with block 203. The blocking signal prevent the combiner from using two of the seven traffic channels TC1—TC7 for normal traffic transportation. Instead two time slots, time slot 2 and time slot 5, in the frame FRA are selected and prepared for receiving information from the data store unit D.

Sending of mobile station changeover signals S12 from the base station RBS to the two mobile stations MS1 and MS2, in accordance with block 204.

Changeover in the mobile stations MS1 and MS2 from traffic state to loading state, in accordance with block 205.

Identification of channels 2 and 5 corresponding to the memory units M1 and M2 to be loaded, in accordance with block 206.

Distribution of data DT from the data store unit D to the channels in the frame FPA sent out from the base station RBS, in accordance with block 207.

Transmission of the frame FRA from the base station RBS to the mobile stations MS1 and MS2, in accordance with block 208.

Distribution of the loading data from the channels 2 and 5 to the memory modules M1 and M2.

Storing of the received data DT in the memory modules M1 and M2 in the mobile stations MS1 and MS2, in accordance with block 210.

Sending of the mobile station changeback signal S13 from the base station RBS to the two mobile stations MS1 and MS2, in accordance with block 211.

Changeback in the mobile stations MS1 and MS2 from loading state to traffic state, in accordance with block 212.

Sending of a mobile subscriber deblocking signal S14 from the central processor RCP to the combiner COMB, in accordance with block 213.

Setting the combiner COMB in a state where it is once again possible to receive traffic data, in accordance with block 214.

Figure 7:
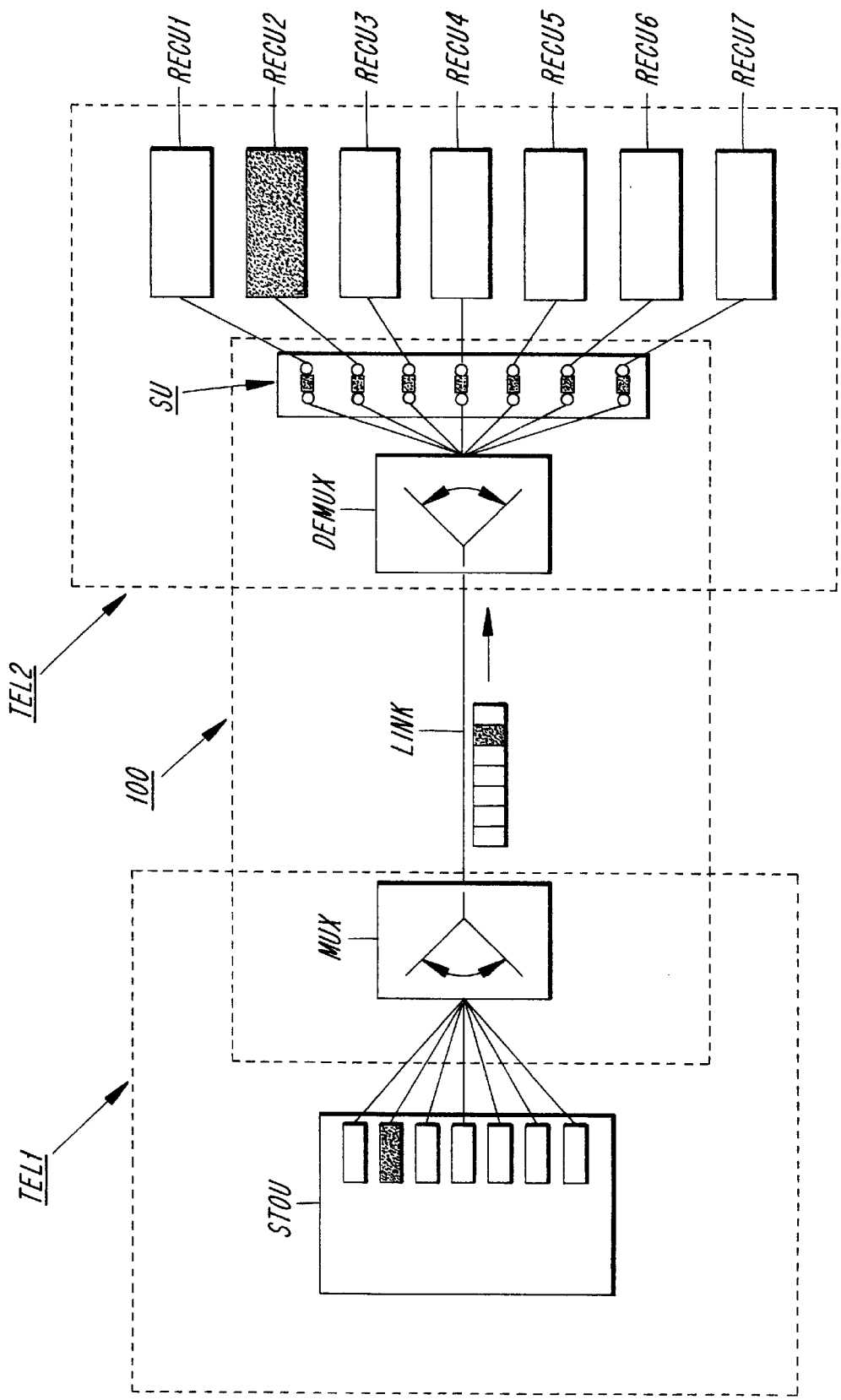
FIG. 7 is a block schematic illustration of a transfer arrangement.

FIG. 7 shows a simplified block diagram illustrating an embodiment of an arrangement 100 according to the invention. In FIG. 7 a first telestation TEL1 is operationally connected to a second telestation TEL2 via a link LINK. The first telestation TEL1 comprises a store unit STOU in which data intended to be transported to the second telestation TEL2 is stored. The store unit STOU is divided into seven parts, each part carrying software intended for one memory unit amongst seven units RECU1–RECU7 in the second telestation TEL2. The memory units are hereinafter called receive units RECU1–RECU7. The receive units RECU1–RECU7 contain application software necessary to control the second telestation TEL2. The first telestation TEL1 also comprises a multiplex circuit MUX connected between the store unit STOU and the link. The multiplex circuit MUX is able to multiplex data from the first telestation TEL1 to the link. The second telestation TEL2 comprises in addition to the already mentioned receive units RECU1–RECU7, a demultiplex circuit DEMUX operationally connected between the link and the receive units RECU1–RECU7. A switch unit SU in the second telestation TEL2 is arranged to attach receive units RECU1–RECU7 to the link via the demultiplex circuit DEMUX. The receive units RECU1–RECU7 each contain software necessary to handle different tasks in the second telestation TEL2, e.g. tasks like handling of a transceiver unit. The arrangement 100 comprises the multiplex circuit MUX in the first telestation TEL1, the link LINK, the switch unit SU and the demultiplex circuit DEMUX in the second telestation TEL2. The link comprises a number of channels, control and traffic channels, each traffic channel corresponding to one of the receiving units RECU1–RECU7, i.e. when attached by the switch unit SU. The multiplex circuit MUX is arranged to connect a part in the store unit STOU in the first telestation to a channel corresponding to a memory unit RECU2 to be loaded in the second telestation TEL2. The demultiplex circuit DEMUX is arranged to connect the corresponding channel in the link with the memory unit RECU2 to be loaded, i.e. when the unit is attached to the demultiplex circuit DEMUX with aid of the switch unit SU. The ability of the arrangement to transfer via a traffic channel data from the first telestation TEL1 to the second telestation TEL2 is illustrated in FIG. 7 with flat coloured symbols in the store unit STOU, in the link and in the memory unit RECU2 to be loaded.

A large number of variations of the above mentioned embodiments are of course possible. As earlier have been said only the most pertinent steps for the invention are mentioned in the methods above. It is also possible load more than one memory unit by using more than one traffic channel in the same frame. Another possibility is to store the software in a terminal like the one mentioned above instead of in the data store unit. In other words, the invention is not restricted to the aforedescribed and illustrated exemplifying embodiments since modifications can be made within the scope of the following claims.

What is claimed is:

1. A method in a telecommunication system for transferring of software from a telestation into at least one selected memory unit amongst a plurality of memory units in a teleunit, wherein the telestation is operationally connected via a transmission link to the teleunit, and said transmission link comprises a plurality of traffic channels each channel corresponding to at least one of the memory units and said method comprising the steps of:

identifying a traffic channel corresponding to the selected memory unit;

forwarding of data from a data store unit in the telestation to the identified channel on the transmission link;

transmitting the data in the transmission link from the telestation to the teleunit;

distributing the data from the identified channel on the transmission link to the selected memory unit in the teleunit; and storing the data in the selected memory unit.

2. A method in a telecommunication system according to claim 1, wherein the software controls the teleunit.

3. A method in a telecommunication system according to claim 1, said method comprising the further step of:

connecting the selected memory unit to the transmission link.

4. A method related to a telecommunication system according to claim 1, wherein the traffic channels are formed in accordance with a TDMA-concept.

5. A method related to a telecommunication system according to claim 1, wherein the traffic channels are formed in accordance with a FDMA-concept.

6. A method related to a telecommunication system according to claim 1, wherein the traffic channels are formed in accordance with a CDMA-concept.

7. An arrangement in a telecommunication system for transferring of software from a data store unit in a telestation into at least one selected receive unit amongst a plurality of units in a teleunit, wherein the arrangement comprises:

a transmission link between the telestation and the teleunit wherein the link is arranged to transport software from the telestation to the teleunit and wherein the link is divided into a plurality of traffic channels, each channel corresponding to at least one of the receive units.

a multiplex circuit located in the telestation between the data store unit and the link wherein the multiplex circuit is arranged to distribute software from the store unit to a channel in the link corresponding to the selected receive unit to be loaded; and a demultiplex circuit located in the teleunit between the link and the receive units wherein the demultiplex circuit is arranged to distribute data from the channel in the link to the corresponding selected receive unit.

8. An arrangement in a telecommunication system according to claim 7, wherein the software controls the teleunit.

9. An arrangement related to a telecommunication system according to claim 7, wherein the traffic channels are formed in accordance with a FDMA-concept.

10. An arrangement related to a telecommunication system according to claim 7, wherein the traffic channels are formed in accordance with a TDMA-concept.

11. An arrangement related to a telecommunication system according to claim 7, wherein the traffic channels are formed in accordance with a CDMA-concept.

12. In a telecommunication network comprising stored program controlled communication nodes and communication links having time multiplexed traffic channels for connection of subscriber units via the nodes and links, a method of updating software for controlling a node comprising the steps of:

selecting a node to be updated;

identifying a free traffic channel on a communication link to the node to be updated;

barring the identified traffic channel from being used for a connection to a subscriber unit;

supplying the communication link with the software update;

transmitting the software update on the barred traffic channel of the communication link;

forwarding the software update from the barred traffic channel of the communication link to the node;

storing of the software update in the program store of the node; and inhibiting the barring of the traffic channel.

13. In a telecommunication network comprising stored program controlled communication nodes and communication links having time multiplexed traffic channels for connection of stored program controlled subscriber units via the nodes and links, a method of updating software for controlling a node comprising the steps of:

selecting a subscriber unit to be updated;

identifying a free traffic channel on a communication link to the subscriber unit to be updated;

barring the identified traffic channel from being used for a connection to a subscriber unit;

supplying the communication link with the software update;

transmitting the software update on the barred traffic channel of the communication link;

forwarding the software update from the barred traffic channel of the communication link to the subscriber unit; and storing of the software update in the program store of the subscriber unit;

inhibiting the barring of the traffic channel.

* * * * *